United States Patent
Bai et al.

(10) Patent No.: US 10,560,024 B2
(45) Date of Patent: Feb. 11, 2020

(54) BIDIRECTIONAL DC/DC CONVERTER FOR A CHARGING SYSTEM

(71) Applicant: Conductive Holding, LLC, Akron, OH (US)

(72) Inventors: Hua Bai, Flint, MI (US); Alexander Balogh, Akron, OH (US); Xuntuo Wang, Cambridge, MA (US)

(73) Assignee: Conductive Holding, LLC, Cambridge, MA (US)

( * ) Notice: Subject to any disclaimer, the term of this patent is extended or adjusted under 35 U.S.C. 154(b) by 225 days.

(21) Appl. No.: 14/857,191

(22) Filed: Sep. 17, 2015

(65) Prior Publication Data

US 2017/0080808 A1 Mar. 23, 2017

(51) Int. Cl.
| | |
|---|---|
| *H02M 3/335* | (2006.01) |
| *H02M 3/337* | (2006.01) |
| *H02J 50/12* | (2016.01) |
| *H02J 7/00* | (2006.01) |
| *H02J 7/02* | (2016.01) |

(Continued)

(52) U.S. Cl.
CPC ......... *H02M 3/33507* (2013.01); *B60L 53/00* (2019.02); *H02J 7/0027* (2013.01); *H02J 7/025* (2013.01); *H02J 50/12* (2016.02); *H02M 3/3376* (2013.01); *H02M 2001/0058* (2013.01); *Y02B 70/1491* (2013.01); *Y02T 10/7055* (2013.01)

(58) Field of Classification Search
CPC ... B60L 11/1809; H02J 7/02; H02M 3/33507; H02M 3/3376; H02M 2001/0058
USPC ........................................................ 320/109
See application file for complete search history.

(56) References Cited

U.S. PATENT DOCUMENTS

| | | |
|---|---|---|
| 5,388,040 A | 2/1995 | Hall |
| 8,541,905 B2 | 9/2013 | Brabec |

(Continued)

FOREIGN PATENT DOCUMENTS

WO    WO-2015/044856 A1    4/2015

OTHER PUBLICATIONS

Bai, H., et al., "Design of an 11 kWpower factor correction and 10kW ZVS DC/DC Converter for a High-Efficiency Battery Charger in Electric Vehicles," IET Power Electronics, revised Sep. 18, 2012, pp. 1-9.

(Continued)

*Primary Examiner* — Nathaniel R Pelton
(74) *Attorney, Agent, or Firm* — Cesari and McKenna, LLP; James A. Blanchette

(57) ABSTRACT

In one embodiment, a bidirectional DC/DC converter includes a DC/AC inverter having active switches (e.g., MOSFETs), and an AC/DC rectifier having a capacitor that performs DC-bias current blocking and active switches (e.g., MOSFETs) arranged in a bridge configuration. A microcontroller is coupled to the active switches of the DC/AC inverter and AC/DC rectifier and configured to provide control signals thereto according to a control algorithm that, when power is to flow in a forward direction, sends control signals to operate the active switches of the DC/AC inverter at a duty cycle and to disable the active switches of the AC/DC rectifier, and when power is to flow in a reverse direction, sends control signals to operate the active switches of the DC/AC inverter to disable the active switches of the DC/AC inverter and operates the active switches of the AC/DC rectifier at a duty cycle.

19 Claims, 4 Drawing Sheets

(51) Int. Cl.
*B60L 53/00* (2019.01)
*H02M 1/00* (2006.01)

(56) References Cited

U.S. PATENT DOCUMENTS

| | | |
|---|---|---|
| 2009/0103341 A1 | 4/2009 | Lee |
| 2012/0014138 A1* | 1/2012 | Ngo ................ H02M 3/33584 363/17 |
| 2013/0039104 A1 | 2/2013 | Sharma |
| 2013/0328527 A1 | 12/2013 | Kang |
| 2014/0140113 A1 | 5/2014 | Oh |
| 2014/0347893 A1 | 11/2014 | Hunter |
| 2015/0008850 A1 | 1/2015 | Zhao et al. |
| 2015/0049515 A1 | 2/2015 | Zhao et al. |
| 2015/0333634 A1* | 11/2015 | Yoshida ............ H02M 3/33576 363/21.03 |
| 2017/0117731 A1* | 4/2017 | Shimada ............... H02J 7/0052 |

OTHER PUBLICATIONS

Duan, Chen et al. "Design of a 2.5kW 400V→12V High-Efficiency DC/DC Converter Using a Novel Synchronous Rectification Control for Electric Vehicles", ECCE 2013, pp. 1082-1086.

Taylor, Allan et al., "Design of a High-Efficiency 12V/1kW 3-Phase BLDC Motor Drive System for Diesel Engine Emissions Reductions", ECCE 2013, pp. 1077-1081.

* cited by examiner

BIDIRECTIONAL DC/DC CONVERTER FOR A CHARGING SYSTEM

RELATED APPLICATION

This application is related to U.S. Patent Application No. 14/857,222, now issued as U.S. Pat. No. 9,787,117, filed on even date herewith by Hua Bai et al., entitled "A BIDIRECTIONAL BATTERY CHARGER INTEGRATED WITH RENEWABLE ENERGY GENERATION", the contents of which are incorporated by reference herein in their entirety.

BACKGROUND

Technical Field

This application relates generally to circuits that may be used in battery chargers and other types of energy transfer systems, and more specifically to a bidirectional direct current/direct current (DC/DC) converter that may be used in a bidirectional battery charger for an electric vehicle, among other applications.

Background Information

Fast electric chargers with high efficiency are in high demand for charging battery powered devices, such as electric vehicles. For electric vehicles, typical alternating-current (AC) slow chargers include Level 1 chargers that take 120 volt (V) AC, and Level chargers that take 240V AC. Such slow chargers are typically limited to about 1.8 kilowatts (kW) in the case of Level 1 chargers, and 7.2 kW in the case of Level 2 chargers. Certain attempts have been made to produce AC fast chargers with high efficiency. By using components that have greater than 97% efficiency, the overall efficiency of some AC fast chargers may be higher than 94%, in contrast to the less than 91% of most Level 1 and Level 2 AC slow chargers.

One example of an AC fast charger that may provide these properties is shown in FIG. 1. In this design 100, the electrical grid 110 is coupled to a primary side alternating current/direct current (AD/DC) rectifier 120. The primary side AD/DC rectifier 120 provides a first direct current (DC) bus voltage $V_{DC}$ to a direct current/alternating current (DC/AC) inverter 130 of a mono-directional inductor-inductor-capacitor (LLC) resonant DC/DC converter 140. The DC/AC inverter 130 is coupled to a primary side of a transformer T that transfers power to a secondary side coupled to a secondary side AC/DC rectifier 150. The secondary side AC/DC rectifier 150 includes diodes $D_1$, $D_2$, $D_3$, and $D_4$ arranged in a bridge configuration. The output of the secondary side AC/DC rectifier 150 is a voltage $V_b$ on a second DC bus that may be coupled to a battery (having resistance $R_b$) of an electric vehicle.

While such a fast charger design is useful, it has certain limitations. More and more applications require bidirectional power transfer, where, in addition to supplying DC power (e.g., to charger a battery), AC power can also flow back in the other direction to the electrical grid. For example, there is an increasing interest in vehicle-to-grid (V2G) systems where the batteries of grid-connected electric vehicles are used to supply power back as part of a demand response service. The above discussed AC fast charger design is incapable of transferring power back to the electrical grid due, at least in part, to the diodes $D_1$, $D_2$, $D_3$, and $D_4$ used in the secondary side AC/DC rectifier 150.

What is needed is a bidirectional DC/DC converter that may be used in, among other energy transfer systems, a bidirectional AC fast charger, and which may retain various desirable properties (e.g., high efficiency) of certain mono-directional DC/DC converter designs.

SUMMARY

In an example embodiment, a bidirectional DC/DC converter includes a capacitor that performs DC-bias current blocking, and active switches (e.g., metal oxide semiconductor field-effect transistors (MOSFETs)) arranged in a bridge configuration, in a secondary side AC/DC rectifier. The active switches are controlled by a microcontroller that provides control signals according to a control algorithm that alternately disables and operates active switches at a 50% duty cycle, while ensuring the active switches operate under soft switching.

More specifically, in an example embodiment, the bidirectional DC/DC converter is a bidirectional LLC resonant DC/DC converter that is part of a bidirectional AC fast charger for an electric vehicle. The bidirectional LLC resonant DC/DC converter includes a primary side AC/DC rectifier coupled to the electrical grid and a first DC bus. The first DC bus is coupled to a DC/AC inverter that includes two active switches (e.g., MOSFETs) coupled to a network of capacitors and an inductive element, which are in turn coupled to a primary winding of a transformer. A secondary side AC/DC rectifier is coupled to a secondary winding of the transformer. The secondary side AC/DC rectifier may include a capacitor that performs DC-bias current blocking and a bridge configuration of four active switches (e.g., MOSFETs). The secondary side AC/DC rectifier is coupled to a second DC bus, which is coupled to the battery of the electric vehicle.

A microcontroller is coupled to the active switches of the DC/AC inverter and secondary side AC/DC rectifier, and configured to provide control signals (e.g., pulse width modulated (PWM) signals) thereto according to a control algorithm. The control algorithm may be configured to, when power is to flow from the first DC bus to the second DC bus (referred to as the "forward direction"), send control signals to operate the active switches of the DC/AC inverter at a 50% duty cycle and disable the active switches of the secondary side AC/DC rectifier; and when power is to flow from the second DC bus to the first DC bus (referred to as the "reverse direction"), send control signals to disable the active switches of the DC/AC inverter and operate the active switches of the secondary side AC/DC rectifier at a 50% duty cycle. A switching frequency controlled by the control signals determines power flow. The control algorithm may be configured to, when power is to flow from the first DC bus to the second DC bus (the forward direction), set an initial switching frequency, determine if power at the second DC bus is substantially equal to a first target (e.g., a battery charging target), and increase the switching frequency to decrease the power at the second DC bus or decrease the switching frequency to increase the power at the second DC bus, until the power at the second DC bus is substantially equal to the first target. Further, the control algorithm may be configured to, when power is to flow from the second DC bus to the first DC bus (the reverse direction), set the initial switching frequency, determine if power supplied from the second DC bus is substantially equal to a second target (e.g., a battery discharge target), and increase the switching frequency to decrease the power suppled from the second DC bus or decrease the switching frequency to increase the power supplied from the second DC bus, until the power supplied from the second DC bus is substantially equal to the second target. The switching frequency may be limited by the control algorithm to a range that ensures the active switches operate under soft switching.

It should be understood that a bidirectional DC/DC converter according to the teachings of this disclosure may include a variety of additional or alternative components disposed in various additional or alternative arrangements. This Summary is intended simply as an introduction to the reader, and does not indicate or imply that the teachings cover all aspects of the invention, or are necessary or essential aspects of the invention.

BRIEF DESCRIPTION OF THE DRAWINGS

The detailed description below refers to the accompanying drawings of example embodiments, of which.

DETAILED DESCRIPTION OF AN ILLUSTRATIVE EMBODIMENT

Definitions

As used herein the term "electric vehicle" should be interpreted as refer to any type of vehicle that derives some or all of its propulsion from an electrical source, including plug-in electric vehicles such as battery-only electric vehicles (BOEVs) and plug-in hybrid electric vehicle (PHEVs).

Further, as used herein the term "substantially" should be considered (in the absence of an explicit provision of another specific standard) to refer to being within ±5% of a quantity.

Description

Figure 1:
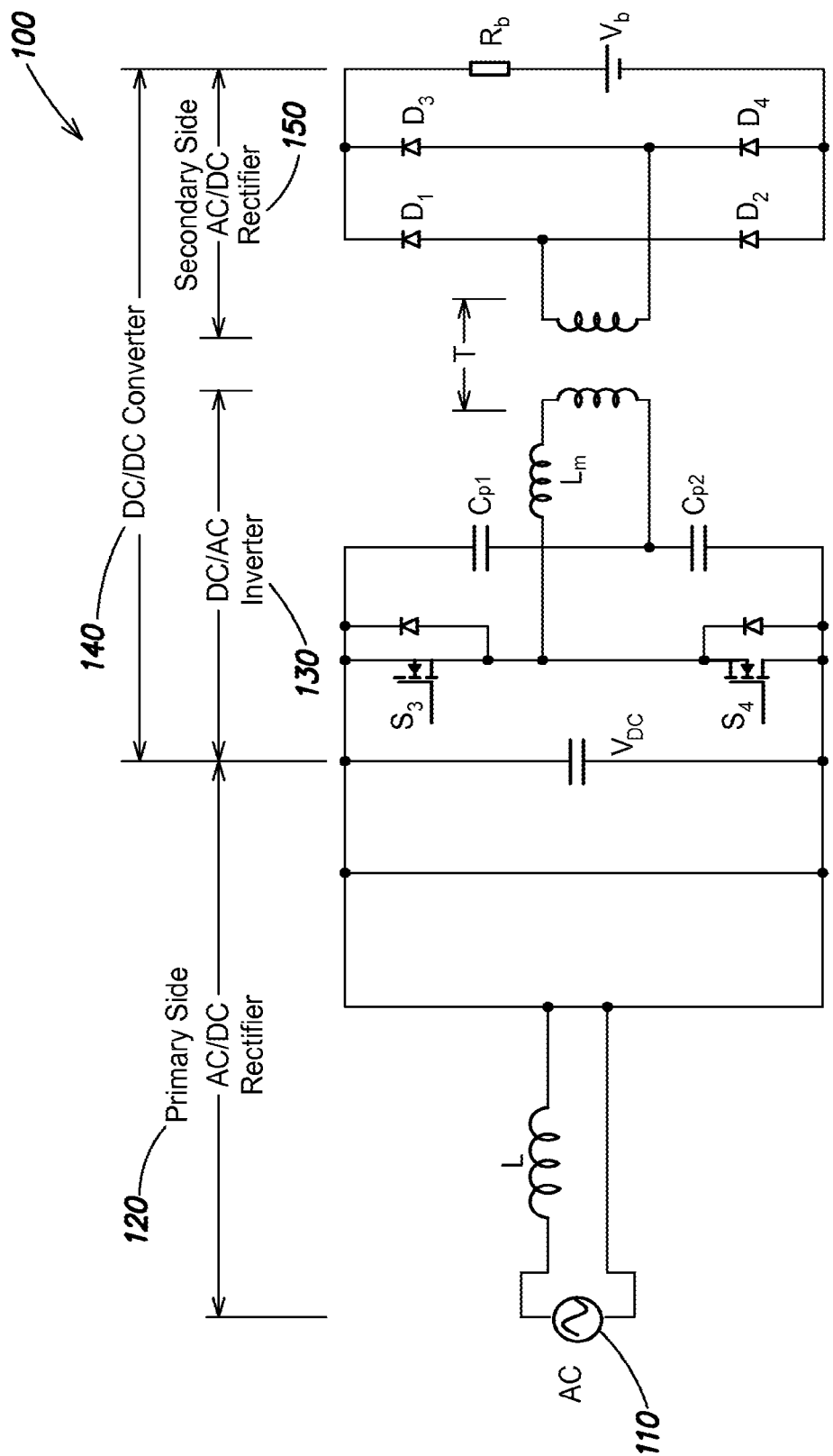
FIG. 1 is a schematic diagram of an existing AC fast charger design.
Figure 2:
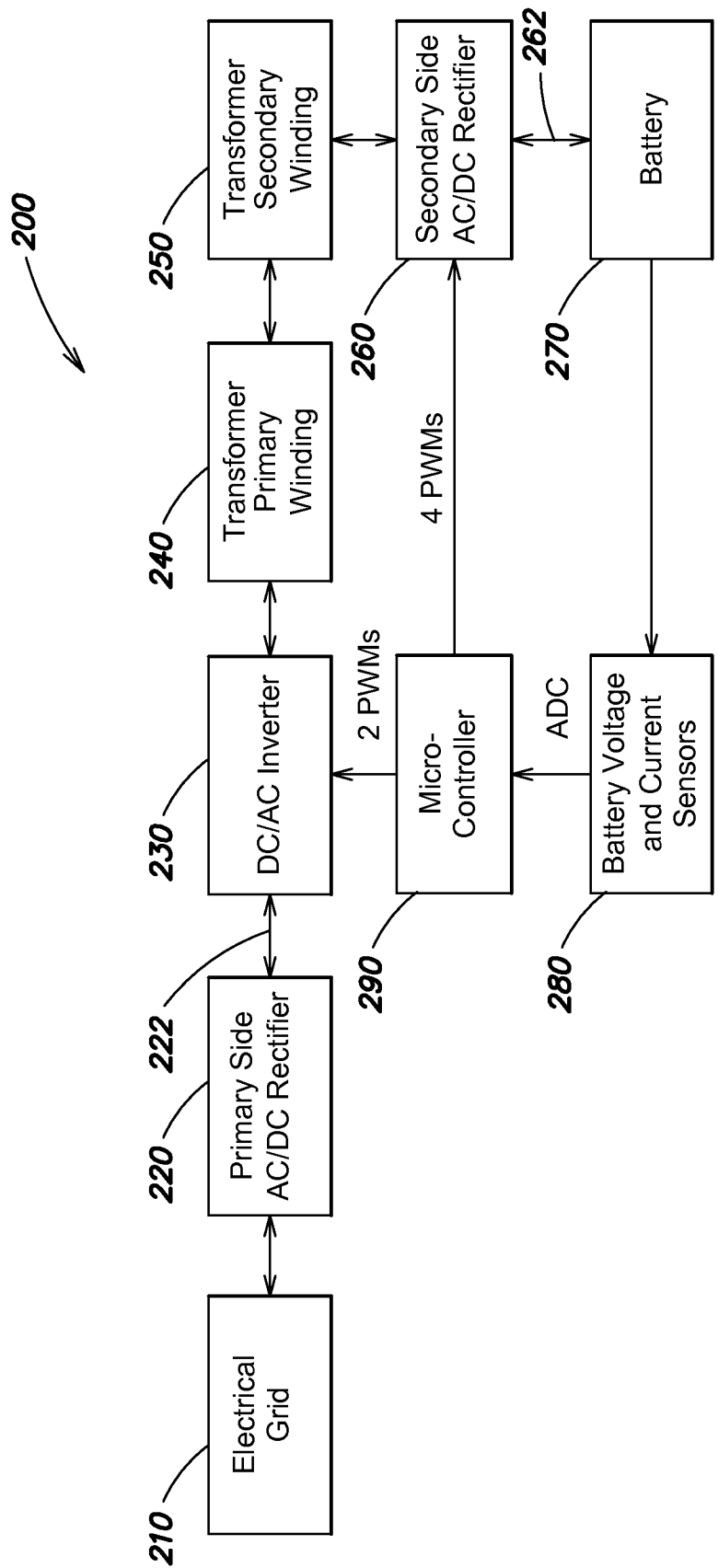
FIG. 2 is a high-level block diagram of an example bidirectional AC fast charger that includes a bidirectional LLC resonant DC/DC converter.

FIG. 2 is a high-level block diagram 200 of an example bidirectional AC fast charger that includes a bidirectional LLC resonant DC/DC converter. The electrical grid 210 provides AC power (e.g., as 240V single phase to 480V three phase), and when the direction of power flow is reversed (e.g., as part of a V2G system) sinks AC power. The electrical grid 210 is coupled to a primary side AC/DC rectifier 220. The primary side AC/DC rectifier 220 is coupled via a first DC bus 222 to a DC/AC inverter 230. The DC/AC inverter 230 may include two active switches (e.g., MOSFETs) coupled to a network of capacitors and an inductive element, which are in turn coupled to a primary winding 240 of a transformer. The primary winding 240 exchanges power with a secondary winding 250 of the transformer (e.g., via conductive wireless power transfer). The secondary winding 250 is coupled to a secondary side AC/DC rectifier 260 that includes at least a capacitor that performs DC-bias current blocking, and a bridge configuration of four active switches (e.g., MOSFETs). The secondary side AC/DC rectifier 260 is coupled via a second DC bus 262 to a battery 270, for example of an electric vehicle (not shown). In one implementation, the second DC bus 262 may deliver substantially 11 kilowatts (kW) of power to the battery 270 at 200V to 450V.

One or more battery voltage and current sensors 280 are coupled to the battery 270 and used to monitor power supplied to the battery (charging power) and power returned from the battery back toward the electrical grid (discharge power). After an analog-to-digital (ADC) conversion, the measure of charging power/discharge power is supplied to a microcontroller 290 (e.g., a floating point digital signal processor (DSP)) that executes a control algorithm. The microcontroller 290 provides control signals (e.g., pulse width modulated (PWM) signals) according to the control algorithm to the active switches of the DC/AC inverter 230 and the secondary side AC/DC rectifier 260.

Figure 3:
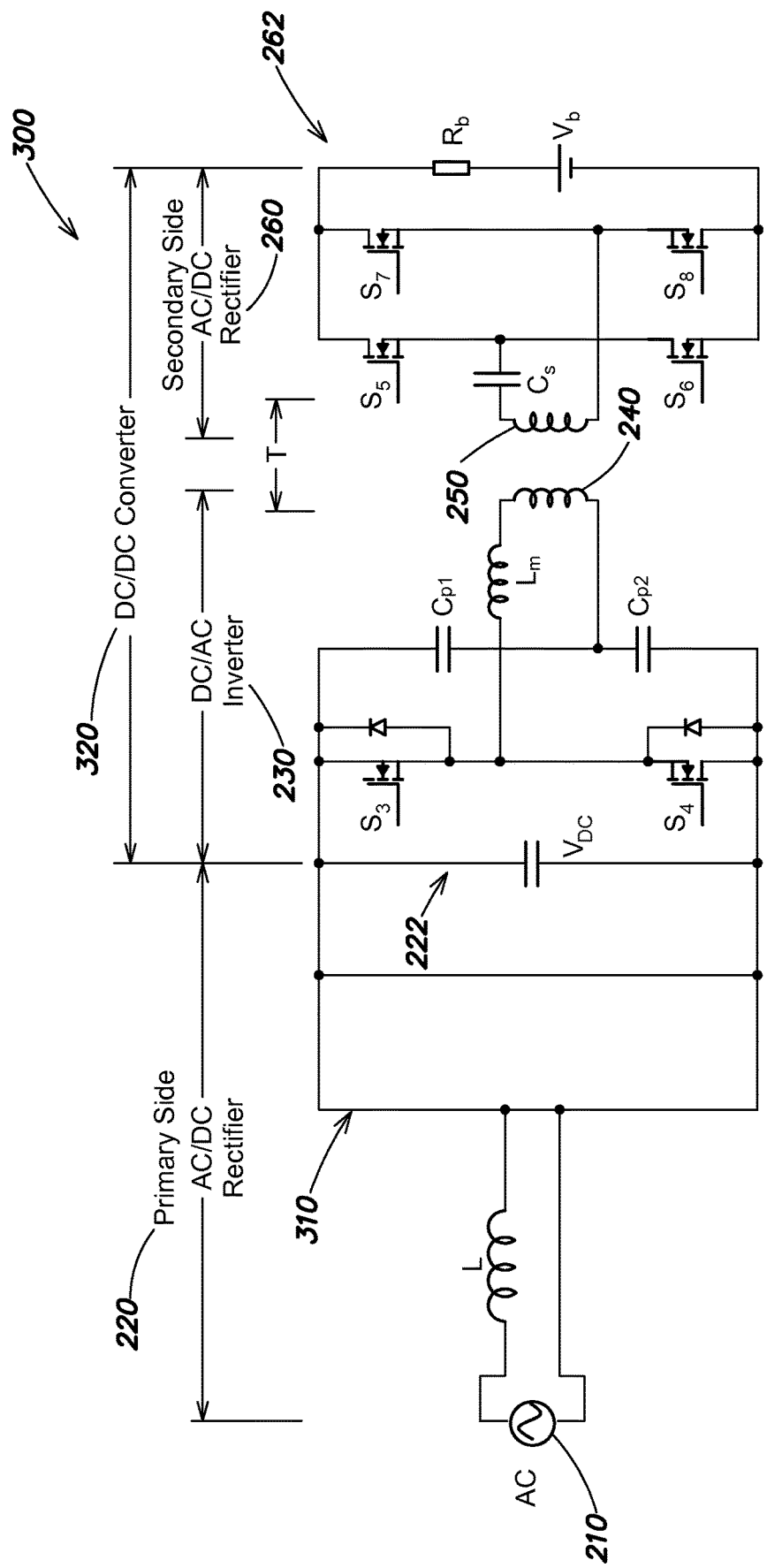
FIG. 3 is a schematic diagram of the example bidirectional AC fast charger of FIG. 2, showing details of example circuitry.

FIG. 3 is a schematic diagram 300 of the example bidirectional AC fast charger of FIG. 2, showing details of example circuitry. For simplicity, the voltage and current sensors 280, the microcontroller 290, and any control signal paths coupling the microcontroller 290 to the active switches are omitted. The electrical grid 210 supplies power AC to an inductive element L and diodes and active switches (collectively 310) of the primary side AD/DC rectifier 220. The diodes and active switches 310 may be arranged according to a full-bridge PFC topology including fast-speed insulated-gate bipolar transistors (IGBTs) under space vector pulse width modulation (SVPWM) control, or some other arrangement. The primary side AD/DC rectifier 220 is coupled to a first DC bus 222 that has a voltage $V_{DC}$, which is coupled to the DC/AC inverter 230 of the bidirectional LLC resonant DC/DC converter 320. The DC/AC inverter 230 may include a pair of active switches $S_3$ and $S_4$ coupled to a network of capacitors $C_{p1}$ and $C_{p2}$, and an inductive element $L_m$. The active switches $S_3$ and $S_4$ may be MOSFETs. In the example 11 kW charger implementation discussed above, they may be 600V N-Channel Power MOSFETs.

The DC/AC inverter 130 is coupled to a primary side of a transformer T that, for example, supports conductive wireless power transfer to a secondary side of a transformer T coupled to a secondary side AC/DC rectifier 260. The secondary side AC/DC rectifier 260 may include a capacitor $C_s$ that performs DC-bias current blocking, as well as active switches $S_5$, $S_6$, $S_7$, and $S_8$ arranged in a bridge configuration. The active switches $S_5$, $S_6$, $S_7$, and $S_8$ may be MOSFETs. In the example 11 kW charger implementation discussed above, they may be 600V N-Channel Power MOSFETs.

Further, in such implementation, the capacitor may be a less 1 microfarad air-cooled (mF) ceramic capacitor. The output of the secondary side AC/DC rectifier 260 is a voltage $V_b$ on a second DC-bus 262 that may be coupled to a battery 270 (having resistance $R_b$), for example, of an electric vehicle.

Figure 4:
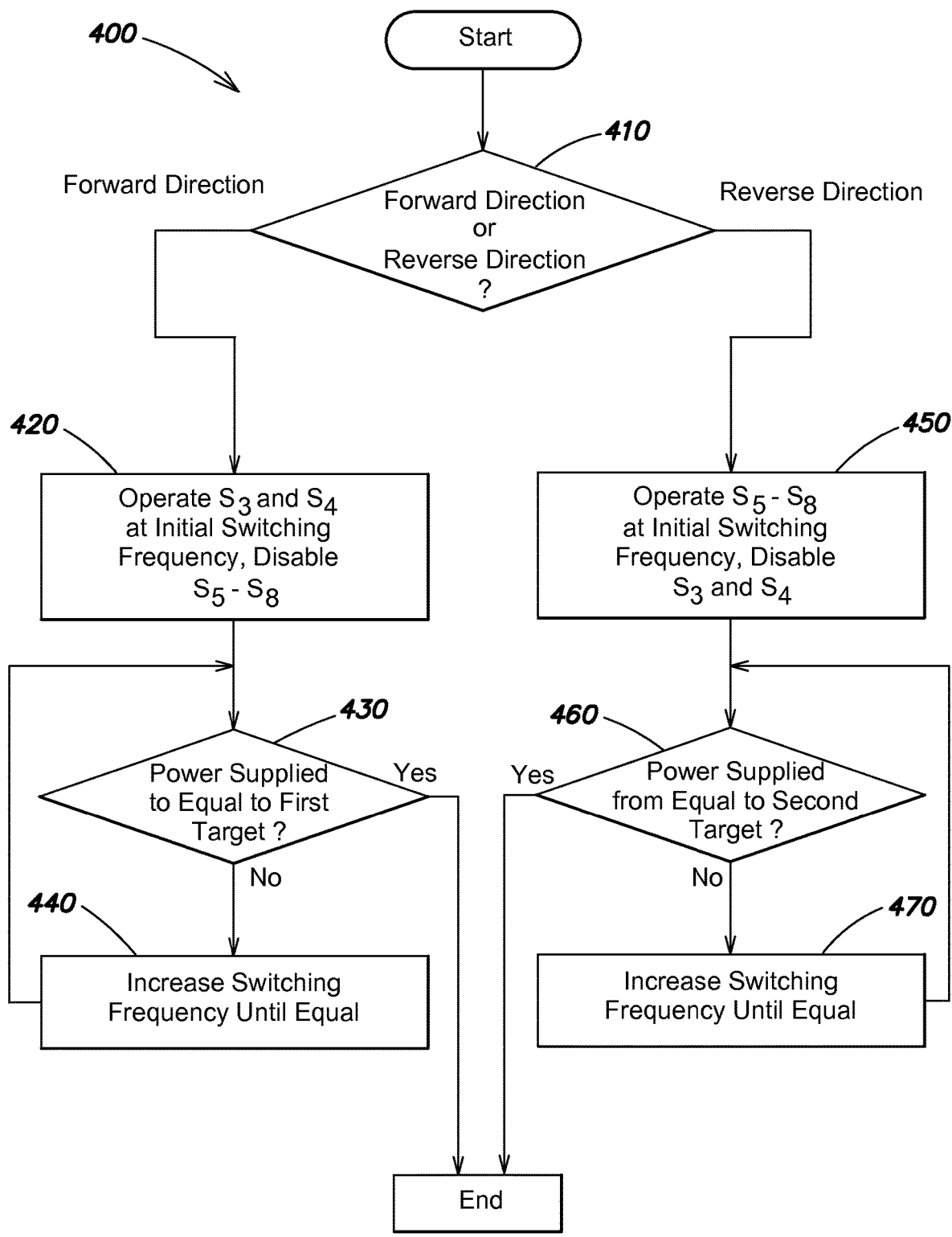
FIG. 4 is a flow diagram of certain steps of an example control algorithm that may be executed by a microprocessor of the example bidirectional AC fast charger of FIGS. 2 and 3.

FIG. 4 is a flow diagram of certain steps 400 of an example control algorithm that may be executed by a microprocessor of the example bidirectional AC fast charger of FIGS. 2 and 3. At step 410, the control algorithm determines whether power is to flow from the first DC bus 222 to the second DC bus 262 (the "forward direction), for example to charge the battery 270, or is to flow from the second DC 262 bus to the first DC bus 222 (the "reverse direction"), for example, discharging the battery to return power to the electrical grid 210. When power is to flow in the forward direction (e.g., to charge the battery) execution proceeds to step 420, where the control algorithm sends control signals (e.g., PWM signals) to operate the active switches $S_3$ and $S_4$ of the DC/AC inverter 230 at a 50% duty cycle and to disable the active switches $S_5$, $S_6$, $S_7$, and $S_8$ of the secondary side AC/DC rectifier 260. A switching frequency controlled by the control signals (e.g., by their modulation) determines power flow. As part of step 420, the control signals may be set to provide an initial switching frequency within a switching frequency range. At step 430, the control algorithm determines if power supplied to the second DC bus 262 (e.g., the charging power) is substantially equal to a first target (e.g., a battery charging target). If not, execution proceeds to step 440, where the control algorithm increases the switching frequency to decrease the power at the second DC bus 262 or decreases the switching frequency to increase the power at the second DC bus, within the switching frequency range, until the power at the second DC bus is substantially equal to the first target (e.g., charging power substantially equal to battery charging target). If so, execution ends.

When power is to flow in the reverse direction (e.g., to discharge the battery) execution proceeds to step 450, the control algorithm sends control signals (e.g., PWM signals) to disable the active switches $S_3$ and $S_4$ of the DC/AC inverter 230 and operate the active switches $S_5$, $S_6$, $S_7$, and $S_8$ of the secondary side AC/DC rectifier 260 at a 50% duty cycle. As part of step 450, the control signals may be set to provide an initial switching frequency within the switching frequency range. At step 460, the control algorithm determines if power supplied from the second DC bus 262 (e.g., the discharge power) is substantially equal to a second target (e.g., a battery discharge target). If not, execution proceeds to step 470, where the control algorithm increases the switching frequency to decrease the power supplied from the second DC bus 262 or decreases the switching frequency to increase the power supplied from the second DC bus 262, within the switching frequency range, until the power supplied from second DC bus is substantially equal to the second target (e.g., discharge power substantially equal to battery discharge target). If so, execution ends.

The frequency range may be selected to ensure the active switches $S_3$-$S_8$ operate under soft switching. For example, the frequency range may be selected to be between frequencies $f_l$ and $f_m$, where these quantities are defined by the formulas:

$$f_l = \frac{1}{2\pi\sqrt{2 * C_p * L}}$$

$$f_m = \frac{1}{2\pi\sqrt{2 * C_p * (L_m + L)}}$$

where $C_p$ is the capacitance of the capacitors in the DC/AC inverter 230, L is the inductance of the inductive element in the primary side AC/DC rectifier 220 and $L_m$ is the inductance of the inductive element in the secondary side AC/DC rectifier 260.

In conclusion, while the above description discusses an example embodiment of an improved DC/DC converter, it should be understood that modifications and/or additions may be made without departing from the disclosure's intended spirit and scope. For example, while the above description discusses an example use of the DC/DC converter in a battery charging system (e.g., for an electric vehicle), it should be understood that the DC/DC converter may be used in other types of systems, such as DC motor drives, fuel cell energy systems, uninterruptible power supplies (UPS) or other types of other types of energy transfer systems that support bidirectional energy transfer. Similarly, while various specific hardware components are discussed above, it should be understood that one or more functionally similar components may be substituted for each of such components, to achieve similar effects. Above all, it should be understood that the above descriptions are meant to be taken only by way of example.

What is claimed is:

1. A bidirectional direct current/direct current (DC/DC) converter comprising:
    a direct current/alternating current (DC/AC) inverter coupled to a first direct current (DC) bus and to a primary winding of a transformer, the DC/AC inverter including active switches;
    a secondary side AC/DC rectifier coupled to a secondary winding of the transformer and a second DC bus, the secondary side AC/DC rectifier including:
        a capacitor that performs DC-bias current blocking, and
        a bridge configuration of active switches coupled to the capacitor and the secondary winding, and to a second DC bus; and
    a microcontroller coupled to the active switches of the secondary side AC/DC rectifier, and configured to provide control signals thereto according to a control algorithm, the control algorithm configured to:
        when power is to flow from the first DC bus to the second DC bus, send control signals at a switching frequency having a first initial value to operate the active switches of the DC/AC inverter at a duty cycle and disable the active switches of the secondary side AC/DC rectifier, determine if power at the second DC bus is substantially equal to a first target, and increase the switching frequency of the control signals that operate the active switches of the DC/AC inverter to decrease the power at the second DC bus or decrease the switching frequency of the control signals that operate the active switches of the DC/AC inverter to increase the power at the second DC bus until the power at the second DC bus is substantially equal to the first target, and
        when power is to flow from the second DC bus to the first DC bus, send control signals to disable the active switches of the DC/AC inverter and at a switching frequency having a second initial value to operate the active switches of the secondary side AC/DC rectifier at the duty cycle, determine if power supplied from the second DC bus is substantially equal to a second target, and increase the switching frequency of the control signals that operate the active switches of the secondary side AC/DC rectifier to decrease the power supplied from the second DC bus or decrease the switching frequency to increase the power supplied from the second DC bus until the power supplied from the second DC bus is substantially equal to the second target.

2. The bidirectional DC/DC converter of claim 1, wherein the control signals that operate the active switches of the DC/AC inverter and operate the active switches of the secondary side AC/DC rectifier are pulse width modulated (PWM) control signals, and the control algorithm is configured to limit the switching frequency of the control signals that operate the active switches of the DC/AC inverter and the control signals that operate the active switches of the secondary side AC/DC rectifier within a frequency range.

3. The bidirectional DC/DC converter of claim 2, wherein the frequency range is a range selected to ensure the active switches of the DC/AC inverter and the active switches of the secondary side AC/DC rectifier operate under soft switching.

4. The bidirectional DC/DC converter of claim 1, wherein the active switches of the secondary side AC/DC rectifier are metal oxide semiconductor field-effect transistors (MOSFETs).

5. The bidirectional DC/DC converter of claim 4, wherein the delivered power at the second DC bus is substantially equal to 11 kilowatts (kW), the delivered voltage range at the second DC bus is 200V to 450V, the capacitor is greater than 1 microfarad (mF) and the MOSFETs are 600V N-Channel Power MOSFETs.

6. The bidirectional DC/DC converter of claim 1, wherein the bidirectional DC/DC converter is part of an AC battery charger that includes a primary side AC/DC rectifier coupled to an electrical grid and the first DC bus, and wherein a battery is coupled to the second DC bus.

7. The bidirectional DC/DC converter of claim 6, wherein the battery is a battery of an electric vehicle, and when power is to flow from the first DC bus to the second DC bus the battery of the electric vehicle is charged, and when power is to flow from the second DC bus to the first DC bus power is supplied back to the electrical grid.

8. A battery charger for an electric vehicle that includes a bidirectional direct current/direct current (DC/DC) converter, comprising:
    a primary side alternating current/direct current (AC/DC) rectifier coupled to an electrical grid and a first direct current (DC) bus;
    a direct current/alternating current (DC/AC) inverter coupled to the first DC bus and a primary winding of a transformer, the DC/AC inverter including active switches;
    a secondary side AC/DC rectifier coupled to a secondary winding of the transformer and a battery of the electric vehicle, the secondary side AC/DC rectifier including:
        a capacitor that performs DC-bias current blocking, and
        a bridge configuration of active switches coupled to the capacitor and secondary winding; and
    a microcontroller coupled to the active switches of the DC/AC inverter and the secondary side AC/DC rectifier, and configured to provide control signals thereto according to a control algorithm, the control algorithm to:
        when power is to flow from the electrical grid to the battery, send control signals at a switching frequency having a first initial value to operate the active switches of the DC/AC inverter at a duty cycle and disable the active switches of the secondary side AC/DC rectifier, determine if power supplied to the battery of the electric vehicle is substantially equal to a first target, and increase the switching frequency of the control signals that operate the active switches of the DC/AC inverter to decrease the power supplied to the battery of the electric vehicle or decrease the switching frequency of the control signals that operate the active switches of the DC/AC inverter to increase the power supplied to the battery of the electric vehicle until the power supplied to the battery of the electric vehicle is substantially equal to the first target;
        when power is to flow from the battery to the electrical grid, send control signals to disable the active switches of the DC/AC inverter and at a switching frequency having a second initial value to operate the active switches of the secondary side AC/DC rectifier at the duty cycle, determine if power supplied from the battery of the electric vehicle is substantially equal to a second target, and increase the switching frequency of the control signals that operate the active switches of the secondary side AC/DC rectifier to decrease the power supplied from the battery of the electric vehicle or decrease the switching frequency to increase the power supplied from the battery of the electric vehicle until the power supplied from the battery of the electric vehicle is substantially equal to the second target.

9. The battery charger for an electric vehicle of claim 8, wherein the control signals are pulse width modulated (PWM) control signals, and the control algorithm is configured to limit the switching frequency of the control signals that operate the active switches of the DC/AC inverter and the control signals that operate the active switches of the secondary side AC/DC rectifier within a frequency range.

10. The battery charger for an electric vehicle of claim 9, wherein the frequency range is a range selected to ensure the active switches of the DC/AC inverter and the active switches of the secondary side AC/DC rectifier operate under soft switching.

11. The battery charger for an electric vehicle of claim 8, wherein the active switches of the secondary side AC/DC rectifier are metal oxide semiconductor field-effect transistors (MOSFETs).

12. The battery charger for an electric vehicle of claim 11, wherein the delivered power to the battery of the electric vehicle is substantially equal to 11 kilowatts (kW), a delivered voltage range at the battery of the electric vehicle is 200V to 450V, the capacitor is greater than 1 microfarad (mF) and the MOSFETS are 600V N-Channel Power MOSFETs.

13. The battery charger for an electric vehicle of claim 12, wherein the battery charger includes one or more battery voltage or current sensors, and the delivered voltage range is set by the microcontroller in response to signals from the one or more battery voltage or current sensors.

14. The battery charger for an electric vehicle of claim 8, wherein bidirectional DC/DC converter is a bidirectional inductor-inductor-capacitor (LLC) resonant DC/DC converter.

15. A battery charger for an electric vehicle that includes a bidirectional direct current/direct current (DC/DC) converter, comprising:
    a primary side alternating current/direct current (AC/DC) rectifier coupled to an electrical grid and a first direct current (DC) bus, the AC/DC rectifier including an inductive element;
    a direct current/alternating current DC/AC) inverter coupled to the first DC bus and a primary winding of a transformer, the DC/AC inverter including active switches, capacitors and an inductive element;
    a secondary side AC/DC rectifier coupled to a secondary winding of the transformer and a battery of the electric vehicle, the secondary side AC/DC rectifier including:
        a capacitor that performs DC-bias current blocking, and
        a bridge configuration of active switches coupled to the capacitor of the secondary side AC/DC rectifier and secondary winding; and
    a microcontroller coupled to the active switches of the DC/AC inverter and the secondary side AC/DC rectifier, and configured to provide control signals thereto according to a control algorithm, the control algorithm to:
        when power is to flow from the electrical grid to the battery, send control signals to operate the active switches of the DC/AC inverter at a duty cycle and to disable the active switches of the secondary side AC/DC rectifier, determine if power supplied to the battery of the electric vehicle is substantially equal to a first target, and increase a switching frequency of the control signals that operate the active switches of the DC/AC inverter to decrease the power supplied to the battery of the electric vehicle or decrease the switching frequency of the control signals that operate the active switches of the DC/AC inverter to increase the power supplied to the battery of the electric vehicle until the power supplied to the battery of the electric vehicle is substantially equal to the first target;

when power is to flow from the battery to the electrical grid, send control signals to disable the active switches of the DC/AC inverter and to operate the active switches of the secondary side AC/DC rectifier at the duty cycle, determine if power supplied from the battery of the electric vehicle is substantially equal to a second target, and increase a switching frequency of the control signals that operate the active switches of the secondary side AC/DC rectifier to decrease the power supplied from the battery of the electric vehicle or decrease the switching frequency to increase the power supplied from the battery of the electric vehicle until the power supplied from the battery of the electric vehicle is substantially equal to the second target wherein the control algorithm is configured to limit the switching frequency of the control signals that operate the active switches of the DC/AC inverter and the control signals that operate the active switches of the secondary side AC/DC rectifier within a frequency range between $f_l$ and $f_m$ to provide soft switching of the active switches of the DC/AC inverter and the active switches of the secondary side AC/DC rectifier, where $$f_l = \frac{1}{2\pi\sqrt{2*C_p*L}}$$

$$f_m = \frac{1}{2\pi\sqrt{2*C_p*(L_m+L)}}$$

where $C_p$ is the capacitance of the capacitors in the DC/AC inverter, L is the inductance of the inductive element in the primary side AC/DC rectifier and $L_m$ is the inductance of the inductive element in DC/AC inverter.

16. The battery charger for an electric vehicle of claim 15, wherein the control signals are pulse width modulated (PWM) control signals.

17. The battery charger for an electric vehicle of claim 15, wherein the active switches of the secondary side AC/DC rectifier are metal oxide semiconductor field-effect transistors (MOSFETs).

18. The battery charger for an electric vehicle of claim 15, wherein the delivered power to the battery of the electric vehicle is substantially equal to 11 kilowatts (kW), a delivered voltage range at the battery of the electric vehicle is 200V to 450V, the capacitor is greater than 1 microfarad (mF) and the MOSFETS are 600V N-Channel Power MOSFETs.

19. The battery charger for an electric vehicle of claim 18, wherein the battery charger includes one or more battery voltage or current sensors, and the delivered voltage range is set by the microcontroller in response to signals from the one or more battery voltage or current sensors.

* * * * *